United States Patent [19]

Delalle

[11] Patent Number: 5,178,535
[45] Date of Patent: Jan. 12, 1993

[54] HEATING TOOL

[75] Inventor: Jacques Delalle, Triel-sur-Siene, France

[73] Assignee: Raychem SA, Cergy - Saint-Christophe, France

[21] Appl. No.: 613,911

[22] PCT Filed: Apr. 6, 1990

[86] PCT No.: PCT/GB90/00533
§ 371 Date: Feb. 1, 1991
§ 102(e) Date: Feb. 1, 1991

[87] PCT Pub. No.: WO90/12247
PCT Pub. Date: Oct. 18, 1990

[30] Foreign Application Priority Data

Apr. 7, 1989 [GB] United Kingdom ................. 8907881

[51] Int. Cl.$^5$ .............................................. F24J 3/00
[52] U.S. Cl. ................................... 432/225; 431/350; 432/183
[58] Field of Search ................ 431/350; 126/401, 410; 432/183, 225, 249

[56] References Cited

U.S. PATENT DOCUMENTS 3,816,065 6/1974 Marietta .............................. 432/225
3,845,755 11/1974 Aske .................................... 432/225
4,449,925 5/1984 Williams et al. ..................... 432/225

FOREIGN PATENT DOCUMENTS 2905021 8/1980 Fed. Rep. of Germany .
2363761 3/1978 France .
  59517 9/1970 Luxembourg .

Primary Examiner—Carroll B. Dority
Attorney, Agent, or Firm—Edith A. Rice; Herbert G. Burkard

[57] ABSTRACT

A device for heating an article such as a heat-shrinkable sleeve (12) by means of a gas torch comprising an element (8) which is mounted on the torch and will deflect hot gases from the torch burner (7) and side arms (9) that are movable between two positions. In one position the article is heated substantially by radiation while in the other position it is heated principally by hot gases which have been produced by the burner and have been deflected by the element.

11 Claims, 2 Drawing Sheets

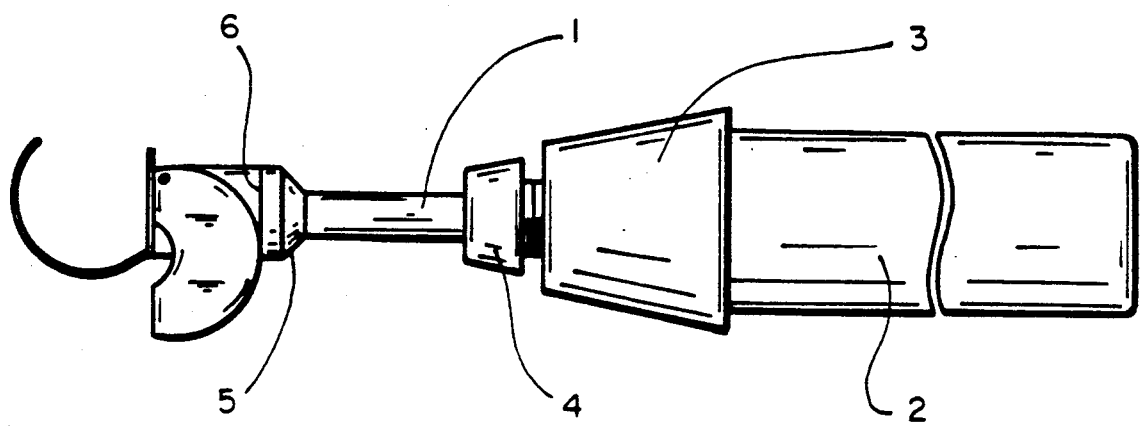
FIG_1
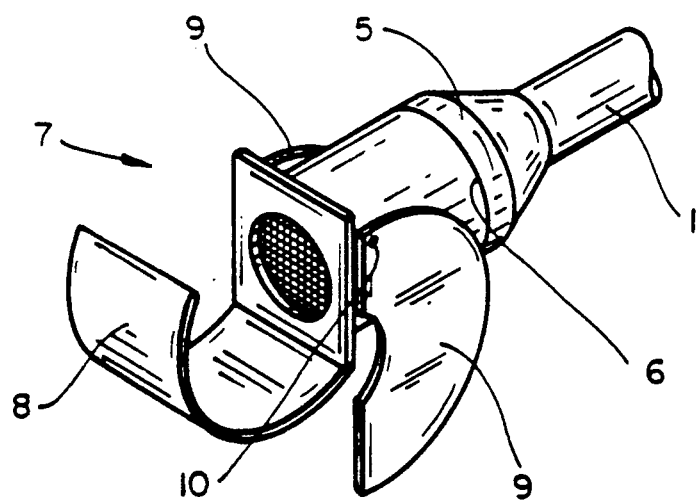
FIG_2

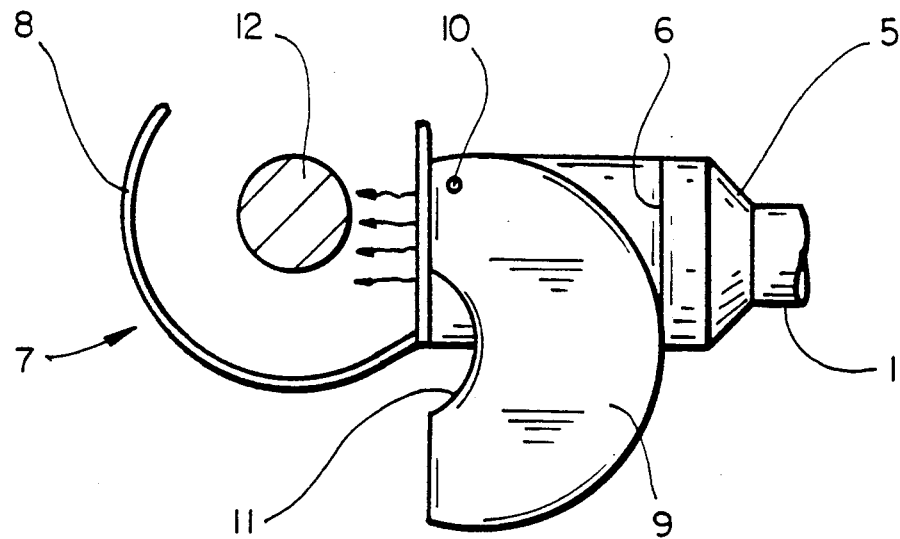
FIG_3
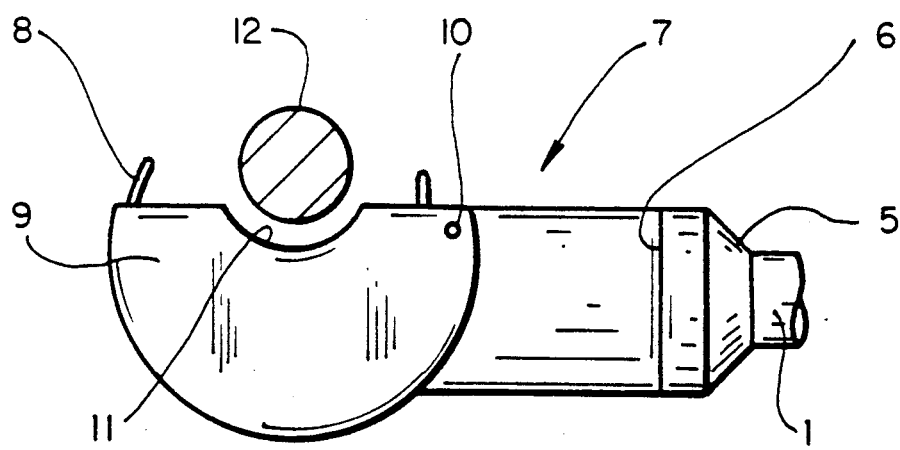
FIG_4

HEATING TOOL

This invention relates to devices for heating articles, especially for heating small articles, and to heating tools that incorporate such devices.

There are many instances in which relatively small, heat-recoverable articles need to be recovered in circumstances in which there is no source of electricity to hand, in which case it has been proposed to employ a gas burner, e.g., a propane or butane gas burner. In addition to the fact that such articles do not require a supply of electricity, they may be manufactured in such a manner that they are readily portable. However, such devices as are presently available have the disadvantage that they cannot recover different articles in a controlled manner. For example the colour, opacity or construction of the article to be heated may affect the speed with which the article is heated to a considerable degree.

According to one aspect, the invention provides a device for heating an article by means of a gas torch that is provided with a burner, which comprises an element that is capable of being mounted on the torch and will deflect hot gases from the burner to one side of the burner, and side arms that are movable between a position in which they allow an article to be positioned with respect to the element so that the article can be heated substantially by radiation emanating from the burner to a position in which the article is at the side of the burner and is heated principally by hot gases which are produced by the burner and which have been deflected by the element.

This form of device may be mounted on a gas torch that is provided with its own burner. Alternatively, the device may itself be provided with a burner. Thus, according to another aspect, the invention provides a device that can be attached to a gas supply in order to heat an article, which comprises a burner for producing heat from combustion of gas derived from the supply, an element that will deflect hot gases from the burner to one side of the burner, and side arms that are moveable between a position in which they allow an article to be positioned with respect of the element so that the article can be heated substantially by radiation emanating from the burner to a position in which the article is to the side of the burner and is heated principally by hot gases which are produced by the burner and which have been deflected by the element.

The device may, if desired, form part of a heating tool which comprises a reservoir for fuel, a burner for combustion of the fuel and a device of the type described above.

The devices according to the invention are relatively simple and therefore can be manufactured relatively inexpensively. In addition, by altering the position of the side arms, it is possible to adjust the relative proportion of hot air and infrared radiation emitted by the device. Thus the device may be employed to heat a range of articles, for example, heat-recoverable solder connectors, heat-recoverable tubing both clear and opaque and of different colours, crimp connectors with heat-recoverable insulation and the like, the optimum proportion of hot air and infrared radiation being selected by adjustment of the side arms.

The burner used in the device may for example comprise a catalytic heating element, for example, comprising a catalyst metal e.g. platinum, that is supported on a ceramic or other refractory support through or past which the gas/air mixture flows.

In the broadest aspect of the invention the element for deflecting the combustion gases may be lustrous so that some proportion of electromagnetic radiation is reflected by it, this form of element being particularly useful where it is intended to heat solder connection devices. Alternatively it may be matt so that relatively little radiation is reflected, in which case the proportion of heating due to conduction from the hot combustion gases when the article is moved to the side of the device is increased. Also, the amount of infrared radiation received by the article to be heated when it is positioned to the side of the burner will depend to some extent on whether or not it is in the line of sight of the burner. Preferably the article is out of the line of sight of the burner when it is in its position at the side of the burner so that it receives a smaller proportion of infrared radiation from it, although in some cases some infrared radiation may be received by the article directly from the burner since, even in those cases, there will be a significant difference in manner of heating an article between the two positions.

A heating tool in accordance with the invention will now be described by way of example with reference to the accompanying drawings in which:

FIG. 1 is a side view of the tool;

FIG. 2 is a perspective view of a deflection device employed in the tool;

FIG. 3 is a side view of the deflection device with its arms in one position; and FIG. 4 is a side view of the deflection device with its arms in another position.

Referring to the accompanying drawings, a tool for heating a range of different heat-shrinkable articles comprises a pipe link 1 that is connected at one end to a reservoir for butane gas fuel in the form of a gas cartridge 2 via a cartridge holder 3 and on/off valve 4. The other end of the pipe link 1 is provided with a widening shoulder region 5 and terminates with a screw thread 6 onto which a ceramic catalytic heating element 7 may be screwed.

At the distal end of the heating element 7 is located a curved deflection element 8 whose size is such that the element can be positioned around the largest size of article without too great a danger of the device or deflection element 8 touching the article. Normally the deflection element will have a radius (or average radius if it is not circular) in the range of from 0.5 cm to 5 cm, especially from 1 to 3 cm. In addition a pair of side arms 9 are supported on the heating element 7 by means of a hinge or pin 10 about whose axis they can be rotated from a first, or open, position as shown in FIGS. 2 and 3 to a second, or closed, position as shown in FIG. 4. Means for retaining the arms in the open or closed position may be provided or instead, and preferably, the arrangement may be designed so that there is sufficient friction against rotation of the side arms that they will remain in either position or in any chosen intermediate position. The arms may be provided with recesses 11, notches, detents or the like for guiding or holding an article to be heated centrally within the deflection element 8. The internal surface of the element 8 has been provided with a matt black oxide coating to supress reflection of infrared radiation.

In operation the position of the side arms 9 is first adjusted in accordance with the type of article to be heated. Once the tool is ignited, hot combustion gases will issue from the heating element and their path will depend to some extent on the position of the side arms 9. If they are in the closed position as shown in FIG. 4 substantially all the gases will be deflected upwardly (as viewed in the drawing) and will leave the tool from the space defined by the top edges of the deflection element 8 and side arms 9 and the top edge of the heating element 7 whereas, if the side arms 9 are in the open position as shown in FIG. 3, some gases may leave to the side of the deflection member.

Articles 12 to be heated, e.g. heat-shrinkable sleeves and discrete components, may then simply be inserted into the hollow deflection member 8 until they (or associated supporting members) about the edges of the side arms 9 at the recesses 11 (it being appreciated that such components are either elongate themselves in the case of heat-shrinkable tubing, or are supported on elongate members such as electrical wiring in the case of discrete components). After the article has been recovered it is simply removed and allowed to cool.

If the side arms of the tool are in their closed position as shown in FIG. 4, the article 12 will remain largely out of the line of sight of the hot members in the heating element 7 and so will be heated principally by the hot air issuing from the device. This configuration of the device is therefore suitable for the recovery of heat-shrinkable tubing, especially tubing that is dark in colour and therefore runs the risk of being overheated when heated by means of infrared radiation. The device configuration in which the side arms 9 are in their open position as shown in FIG. 3 is particularly suitable for the recovery of certain discrete components e.g. crimp devices that are enveloped in a sleeve of shrinkable insulating plastics material, whereas the configuration in which the side arms 9 are in an intermediate position is most appropriate for devices such as heat shrinkable solder connectors.

What is claimed is:

1. A device for heating an article (12) by means of a gas torch including a burner (7), which comprises an element (8) that is mounted on the torch and will deflect hot gases from the burner to one side of the burner and side arms (9) that are pivotably mounted on the torch and movable between a position in which they encounter hot gases deflected laterally of the element and in which they allow an article to be positioned with respect to the element so that the article can be heated substantially by radiation emanating from the burner to a position in which the article is at the side of the burner and is heated principally by hot gases which are produced by the burner and which have been deflected by the element.

2. A device is claimed in claim 1 wherein the element is arcuate and will deflect hot gases emanating from the burner laterally from the device.

3. A device is claimed in claim 1, wherein the side arms are supported on the torch by means of a pin (10) so that they may be moved by rotation about the pin.

4. A device that can be attached to a gas supply in order to heat an article (12) which comprises a burner (7) for producing heat from combustion of gas derived from the supply, and an element (8) that will deflect hot gases from the burner to one side of the burner, and side arms (9) that are pivotably mounted on the device and movable between a position in which they allow an article to be positioned with respect of the element so that the article can be heated substantially by radiation emanating from the burner to a position in which the article is to the side of the burner and is heated principally by hot gases which are produced by the burner and which have been deflected by the element.

5. A device is claimed in claim 4, wherein the element is arcuate and will deflect hot gases emanating from the burner laterally from the device.

6. A device is claimed in claim 4, wherein the side arms are supported on the device by means of a pin (10) so that they may be moved by rotation about the pin.

7. A device as claimed claim 6, wherein the burner (7) comprises a catalytic heater.

8. A tool for heating an article (12) which comprises a reservoir (2) for fuel, a burner (7) for combustion of the fuel and a device for directing heat from the burner to the article, the device comprising an element (8) that will deflect hot gases from the burner to one side of the burner, and side arms (9) that are pivotably mounted to the tool and are movable between a position in which they allow an article to be positioned with respect of the element so that the article can be heated substantially by radiation emanating from the burner to a position in which the article is at the side of the burner and is heated principally by hot gases which are produced by the burner and which have been deflected by the element.

9. A tool as claimed in claim 8, wherein the element is arcuate and will deflect hot gases emanating from the burner laterally from the device.

10. A tool as claimed in claim 8, wherein the side arms are supported by the tool by means of a pin so that they may be moved by rotation about the pin.

11. A tool as claimed claim 8, wherein the burner (7) comprises a catalytic heater.

* * * * *